United States Patent
Coulmeau et al.

(10) Patent No.: US 10,104,012 B2
(45) Date of Patent: Oct. 16, 2018

(54) ADAPTIVE METHOD FOR THE EXECUTION OF SERVICES IN REAL TIME, NOTABLY OF FLIGHT MANAGEMENT AND REAL TIME SYSTEM USING SUCH A METHOD

(71) Applicant: THALES, Courbevoie (FR)

(72) Inventors: François Coulmeau, Toulouse (FR); Frédéric Sanchez, Toulouse (FR); Laurent Castet, Toulouse (FR); Laurent Deweerdt, Toulouse (FR)

(73) Assignee: THALES, Courbevoie (FR)

( * ) Notice: Subject to any disclaimer, the term of this patent is extended or adjusted under 35 U.S.C. 154(b) by 141 days.

(21) Appl. No.: 14/842,253

(22) Filed: Sep. 1, 2015

(65) Prior Publication Data
US 2016/0065497 A1    Mar. 3, 2016

(30) Foreign Application Priority Data

Sep. 1, 2014 (FR) .................................... 14 01937

(51) Int. Cl.
*G06F 15/16* (2006.01)
*H04L 12/911* (2013.01)
*H04L 29/08* (2006.01)

(52) U.S. Cl.
CPC ............ *H04L 47/821* (2013.01); *H04L 67/10* (2013.01); *H04L 67/2828* (2013.01); *H04L 67/322* (2013.01)

(58) Field of Classification Search
CPC ... H04L 47/821; H04L 67/10; H04L 67/2828; H04L 67/322
(Continued)

(56) References Cited

U.S. PATENT DOCUMENTS 8,380,850 B1 * 2/2013 Ahuja ................. H04L 67/32
709/223
2005/0166204 A1 * 7/2005 Takatsu ............... G06F 11/3466
718/100

(Continued)

FOREIGN PATENT DOCUMENTS

| EP | 2 270 664 A2 | 1/2011 |
| EP | 2 945 062 A1 | 11/2015 |
| FR | 2 920 236 A1 | 2/2009 |

OTHER PUBLICATIONS

Michael A. Iverson et al., "Statistical prediction of task execution times through analytic benchmarking for scheduling in a heterogeneous environment," Proceedings of Heterogeneous Computing Workshop, 1999, Jan. 1, 1999, pp. 99-111, XP010333333.
(Continued)

*Primary Examiner* — Wing F Chan
*Assistant Examiner* — Joseph R Maniwang
(74) *Attorney, Agent, or Firm* — Baker & Hostetler LLP

(57) ABSTRACT

The system executes services by an application called "server" for at least one application called "client." A preliminary step establishes for each service a list of calculation parameters that can be varied in a given range, called "adjustable parameters" as well as time and quality of the said service information according to the value of the said parameters. At the request of a client for a given service, the method adjusts the value of the adjustable calculation parameters as a function of a given constraint, the service being executed using the adjusted values of the said parameters.

14 Claims, 5 Drawing Sheets

(58) Field of Classification Search
USPC .......................................................... 709/203
See application file for complete search history.

(56) References Cited

U.S. PATENT DOCUMENTS

| | | | |
|---|---|---|---|
| 2005/0169171 A1* | 8/2005 | Cheng .................... | H04L 47/10 370/229 |
| 2006/0161920 A1* | 7/2006 | An .......................... | G06F 9/485 718/102 |
| 2007/0263541 A1 | 11/2007 | Cobb et al. | |
| 2010/0198433 A1* | 8/2010 | Fortier ................... | G01C 23/00 701/14 |
| 2012/0041951 A1 | 2/2012 | Sauvalle et al. | |
| 2015/0334173 A1 | 11/2015 | Coulmeau et al. | |

OTHER PUBLICATIONS

Marco A. S. Netto et al., "SLA-Based Advance Reservations with Flexible and Adaptive Time QoS Parameters," Service-Oriented Computing—ICSOC 2007, Sep. 17, 2007, pp. 119-131, XP019100289.

* cited by examiner

ADAPTIVE METHOD FOR THE EXECUTION OF SERVICES IN REAL TIME, NOTABLY OF FLIGHT MANAGEMENT AND REAL TIME SYSTEM USING SUCH A METHOD

CROSS-REFERENCE TO RELATED APPLICATIONS

This application claims priority to foreign French patent application No. FR 1401937, filed on Sep. 1, 2014.

The present invention relates to an adaptive method for the execution of services in real time, notably of flight management. It also relates to a real time system using such a method. The invention is notably applicable in onboard systems and more particularly in avionic systems.

Each real time avionic system is architectured and developed to meet performance requirements (notably failure rate and quality of service) in a defined field of use. Each system, connected to other systems, consumes data and services made available by the other systems and produces data of services for the other systems. These interactions are generally set statically during the production of the overall architecture of the "system of systems", that is to say during the allocation of operational functions to the physical systems. Thus, it is frequent in avionics to have several dozen systems responding to all of the aircraft functions. Typically, the aircraft operations are allocated to the systems according to a logical structure, defined in the standardizing document of the ATA (Air Transport Association). The aircraft architecture therefore breaks down into collaborative avionic systems, each one having a well defined function, and interactions with the other systems in order to provide the expected operational service. The different functions are distributed over several physical computers, as chosen by the aircraft manufacturers, in order to guarantee the performance of the missions.

The onboard systems are qualified, with a demonstrated level of performance, for a given environment. The interactions between systems are defined a priori when the aircraft architecture is generated, and the systems are developed and adjusted to meet the strict interaction requirement.

From the "client-server" point of view, where a set of systems called "clients" produce requests to a particular system called "server", there is a problem of guaranteeing the quality of service to the clients in terms of accuracy and response time, or even other performance criteria, that they expect. The problem is thus to make the quality of service more parameterizable as seen by a client so that it does not always have to be slaved to a worse case, which is not necessarily of interest to it.

A problem is that the addition of a new client to a given system gives rise to a very costly requalification. In fact it is necessary to demonstrate again the maintaining of the operational performance of the whole of the "server" system, even when no new service is expected by the "server" system. This restricts the evolution of aircraft operations.

There is therefore a need to be able to allow the addition of new connections and of new clients to a real time "server" system, in all cases guaranteeing for them a response time corresponding to the expectations of the client system, even if it means adapting the quality of service over this response time and providing an improved quality of service later.

A second requirement is to guarantee the correct operation of the overall system that does not degrade its performance and does not give rise to software or hardware modifications of the server.

The addition of a new client or of a new connection would give rise only to a qualification of the client in question and to a demonstration proving that the performance of the system remains in conformity with the required requirements.

A purpose of the invention is notably to meet this requirement. For this purpose the invention relates to a method for the execution of services in real time by an application called "server" for at least one application called "client", a preliminary step establishing for each service a list of calculation parameters that can be varied in a given range, called "adjustable parameters" as well as calculation time and quality of the said service information according to the value of the said parameters, at the request of a client for a given service, the said method adjusting the value of the adjustable calculation parameters as a function of a given constraint, the service being executed using the adjusted values of the said parameters.

The said given constraint involves for example a maximum duration of the time of response to the said request, or the use of a set of non-adjustable calculation parameters. The said constraint is provided to the server by the said client.

In a particular embodiment, for each service, the adjustable parameters are classified by priority, in the case of necessary adjustment of the parameters in order to comply with the said given constraint:

the parameter of highest priority is adjusted firstly and the execution time of the said service is calculated;

if the adjustment of the said parameter of highest priority does not make it possible to comply with the given constraint, even at the limit of its range of variation, the parameter having the next priority is adjusted, the value of the parameter of highest priority remaining fixed at the limit of its range of variation;

and so on, in order of priority, until the constraint is complied with or until all of the adjustable parameters have been set at the limit of their respective range of variation.

In another possible embodiment, for each service, the adjustable parameters are classified by priority, in the case of necessary adjustment of the parameters in order to comply with the said given constraint:

the parameter of highest priority is first adjusted to a first target value within its range of variation and the execution time of the said service is calculated;

if the adjustment of the said parameter of highest priority does not make it possible to comply with the given constraint, even at the limit of the said first target value, the parameter having the next priority is adjusted to a second target value within its range of variation, the value of the parameter of highest priority remaining fixed at the limit of the first target value;

and so on, in order of priority, until the constraint is complied with or until all of the adjustable parameters have been set at their limit, new target values within the ranges of variation of the said parameters being defined if the adjustment is not sufficient after having reached all of the target value limits.

The parameters of a sub-set of the said list are for example adjusted first.

The said list of the adjustable parameters is for example established by the said client. The said ranges of variation of the said parameters are for example determined by the said client.

In a possible embodiment, at least one intermediate result of execution of the said service is calculated with its quality of service. The said intermediate result is for example notified to the said client. The complete execution of the said service is for example carried out after the said intermediate calculation.

In another possible embodiment several successive intermediate results are calculated for example, with parameters increasingly less adjusted for each calculation until the complete calculation of execution of the said service without adjustment of the said parameters, an increasingly less adjusted parameter being a parameter whose value is increasingly distant from the value making it possible to comply with the said given constraint.

The parameters of the said list are for example adjusted each time a new request is received.

The execution of the said request is for example refused if its execution with the said adjustable parameters does not make it possible to comply with the said given constraint. An item of information is for example transmitted to the said client if the execution of the said request with the said adjustable parameters does not make it possible to comply with the said given constraint.

The invention also relates to a real time system implementing the method according to any one of the preceding claims, comprising at least one physical module in which the server is installed, characterized in that the clients are external applications installed in the said physical module, the said clients communicating with the server via a memory inside the module. The clients are for example external applications distributed in other physical modules and communicating with the server via a network protocol, the server executing for example a flight management application.

Other features and advantages of the invention will become apparent with the help of the following description, given with reference to the appended drawings in which.

Figure 1:
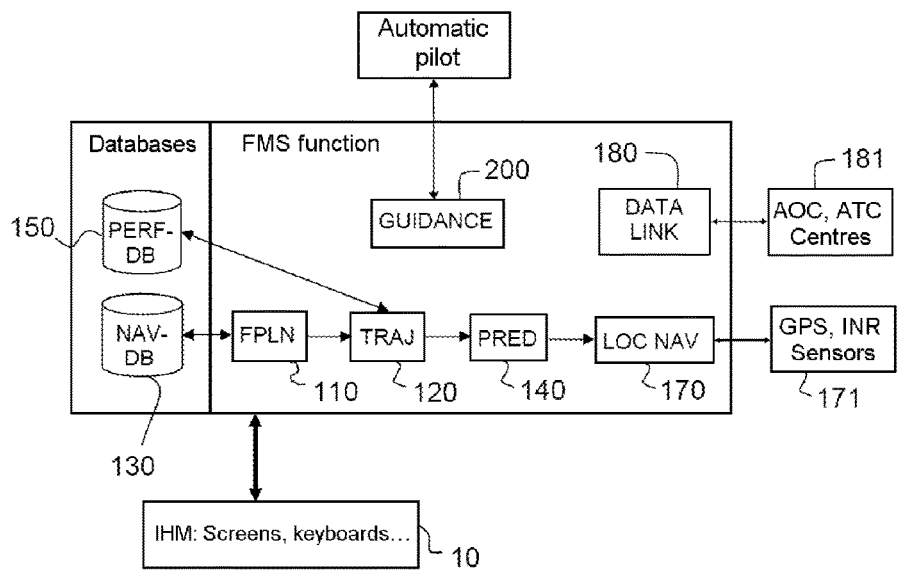
FIG. 1 shows the functional architecture of an onboard flight management system.

FIG. 1 shows the functional architecture of an onboard flight management system, known as FMS (Flight Management System). This well known standard architecture meets the ARINC 702A standard. One of the functions of the FMS is to locate the aircraft by using its sensors 171 (inertial systems, GPS and radio beacons notably). This function is carried out by a locating module LOC NAV 170. The system comprises the following functions and components:

A flight function FPLN 110, for entering the geographic elements constituting the skeleton of the route to follow (departure and arrival procedure, waypoints . . . );

A navigation database NAVDB 130, for constructing geographic routes and procedures on the basis of data contained in the bases (points, beacons, interception or altitude legs . . . );

A performance database, PRF DB 150, containing the aerodynamic and engine parameters of the aircraft;

A lateral trajectory function TRAJ, 120: for constructing a continuous trajectory from the points of the flight plan, complying with the performance of the aircraft and the confinement constraints (RNP);

A prediction function PRED, 140: for constructing an optimized vertical profile on the lateral trajectory;

A guidance function, GUID 200, for guiding the aircraft in the lateral and vertical planes on its 3D trajectory, whilst optimizing its speed;

Digital data link DATALINK, 180 for communicating with the control centres 181 and other aircraft.

From the geographic information contained in the navigation database 130, the pilot can construct his route, called "flight plan" and comprising the list of points passed through called "waypoints", this function being provided by the flight plan function 110. The FMS can manage several flight plans. One of them, known by the acronym "Active" in ARINC 702A denotes the flight plan on which the aircraft is guided. There are working flight plans, sometimes called "secondary flight plans" or "inactive" flight plans, as well as transient flight plans.

The function 120 calculates the lateral trajectory as a function of the geometry between the waypoints, commonly called LEG, and/or the altitude and speed conditions that are used for calculating the turn radius.

On this lateral trajectory, the FMS optimizes a vertical trajectory, in altitude and speed, passing through possible constraints of altitude, speed and time, using a modeling of the aerodynamic and engine performances contained in the performance database 150.

Knowing the location of the aircraft and the 3D trajectory, the FMS can slave the aircraft onto this trajectory, this slaving being carried out by the guidance function 200. All of the information entered or calculated by the FMS is grouped on display screens or other HMI (Human Machine Interface) 10. Communication with the ground, notably with the airline company and with air traffic control, is carried out through the digital data link 180.

In FMS terminology, the term "revision" is used to characterize an insertion, modification or deletion of data in the FMS system, the word "editing" is sometimes used.

In current architectures (whatever the aircraft may be), the "Flight Planning" and "optimized trajectory" part is generally included in a dedicated computer called "FMS", standing for "Flight Management System" (or flight management computer). These functions constitute the core of FM technology.

This system can also host a part of the "Location" and of the "Guidance".

In order to carry out its mission, the FMS is connected to numerous other computers (about a hundred).

Two big clients habitually interact with the FMS system:

The Man Machine Interface (called HMI, standing for "Human Machine Interface") which allows operators (the crew) to interact with the FMS The CMU (Communication Management Unit) interface which allows a ground operator (airline company, air traffic control) to interact with the FMS: This CMU computer is a client for the FMS data and can request modification of the mission (i.e. insert "revisions" in the FMS).

The term "interaction" means a "request" sent to the FMS, with an expected return, as opposed to "information" which consists in third party systems subscribing to the data transmitted periodically or on an event basis by the FMS.

The future operations of the aircraft will however necessitate third party systems interacting with the FMS, that is to say:

Using existing public services

Using existing private services

Using new services to be implemented in the FMS.

The following can be mentioned for example:

Initialization of the FMS flight plan by an external computer (touch tablet, iPad®, EFB standing for "Electronic Flight Bag")

Integration of the "flight plan" of the FMS with the "taxiing plan" of the taxiing computer (called ANF for Airport Navigation Function, AOF for Airport Onboard Function or TAXI or AMM for Airport Moving Map)

Optimizing the mission, called for by a ground client (company tool for example) or onboard client (tablet, EFB) via requests for FMS calculation Updating the FMS software (in particular its Navigation databases, with a 28-day cycle) by a third party equipment (tablet, maintenance tool, EFB)

Utilization of FMS requests by a system for surveillance of the terrain, of the traffic, of meteorological conditions for filtering warnings, or confirming them, or for optimizing lateral and vertical adjustments (for example: avoiding a moving cloud mass detected by a Meteorological Radar)

The traffic surveillance system is known by the acronym TCAS (Traffic Collision Avoidance System) or Traffic Computer The terrain surveillance system is known by the acronym TAWS (Terrain Avoidance Warning System) or GPWS (Ground Proximity Warning System)

The meteorological surveillance system is known by the acronym WxR (Weather Radar)

Utilization of FMS requests to assist the triggering of events on a third party system (for example: Modification of the radio frequency by the RMS (Radio Management System) system when approaching a change of region point.

Checking the conformity of the lateral and/or vertical trajectory calculated by the FMS, with respect to digitized aeronautical maps provided to the crew (stored in a tablet, an EFB for example)

Utilization of the FMS system to know predictions over a given timescale according to defined flight management modes (guidance) and aircraft status (for example: Automatic pilot wishing to know the average climb rate over 2000 feet of altitude change with 1 failed engine; fuel computer wishing to compare the average consumption with the FMS consumption predictions . . . )

Interactions with the FWS (Flight Warning System) for presenting the results of checks, proposing automated DO LIST initiations, directly modifying FMS statuses on confirmation of failures.

Passengers, connected via their cabin interface (IFE pour In Flight Entertainment), wishing to know weather and speed predictions for their destination.

Utilization of the FMS via an AID (Domain Interaction Agent) or an integrated HSI (Human System Interface) which concentrates and organizes the exchanges between computers.

Thus, about ten new clients are likely to interact with the FMS (EFB, WIMS, TCAS, TAWS, WxR, PA, FQMS, IFE); in short, most of the systems of the different ATAs. In the future, it is possible that an even greater number of clients will wish to interact with the "flight management".

However, the rate of requests from different systems is not known a priori, neither is the time at which the request will be made, nor the volume of data that this represents.

If a new system is connected, its intentions (type of requests, frequency) are not known a priori.

The method according to the invention, described below, makes it possible to be capable of facing an unknown number of requests arriving at random times, whilst guaranteeing a response within the time allocated to each one, subject to a reduced accuracy/reliability, by adjustment of the service parameters.

The invention is described for an avionic system but it is applicable to any real time onboard system architecture.

Figure 2A:
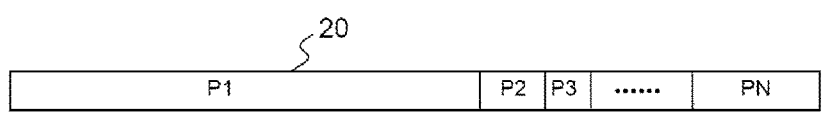
FIGS. 2a and 2b show operational features of real time systems.
Figure 2B:
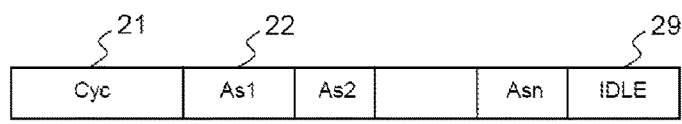

FIGS. 2a and 2b show operational features of these systems. FIG. 2a shows a frame executed by each processor of a computer, this frame being known by the term MIF, the acronym for "Minor Frame". More particularly, each processor executes its code over successive time slots, these slots being MIFs. Each MIF is divided statically or dynamically, depending on the technologies, into time partitions, that is to say into time slots 20 during which a function is executed. In the example shown in FIG. 2a, the MIF comprises N slots P1, P2, P3 . . . PN.

This technology is widely used in so-called IMA (Integrated Modular Avionics) in aeronautics. It makes it possible to host several functions in a common computer resulting in weight and electrical power savings.

In most real time onboard systems, the partitioning is static in order to ensure the determinism of the overall response times of the system. In the same way, the IMA modules allocate, generally statically, the physical RAM and ROM memories that each function will use. This makes it possible to correctly segregate the different functions which are executed within a common module and to have better control over failure problems.

FIG. 2b illustrates the real time execution of a real time function at the level of a partition of an MIF. FIG. 2b shows a succession of processings 22 arranged in order of priority, the processing As2 being able to be executed before the processing As1 but being able to be interrupted by As1 which takes over because its priority is higher, and similarly for Asi-1 with respect to Asi. In general, the system begins by executing the processings 21 of the function called "cyclic". This is processing that has to be executed in each MIF without being interrupted, these processings notably relating to input and output management or to the calculation of information that must be refreshed in each cycle. These processings have a higher priority because it is necessary to guarantee that they will always have the time to be executed. These are in fact tasks like the others but are ones that have generally been given a high priority in order to guarantee that they take place before the other processings.

After the cyclic processing 21, come the asynchronous processings 22. In real time, these are processing that are executed on request (events, periodic wakeup . . . ). The events are generally generated by the peripheral systems connected to the main system. They are arranged in order of processing priority. Thus, in FIG. 2b, a succession of asynchronous processings 21 is shown, the event As1 being followed by the event As2, which is followed by the event As3 and so on until the last event Asn. If P(Asi) denotes the priority of an event, then:

$$P(As1) > P(As2) > P(As3) > \ldots P(Asn).$$

If the first processing As1 necessitates all of the calculation time remaining in the MIF, the other processings will only be able to be executed at best in the following MIF. If the sum of the cyclic 21 and asynchronous 22 processings having to be executed does not exceed the duration of the MIF then free time 29 remains, which is called IDLE.

The response times perceived outside of the system, that is to say perceived by the peripheral systems or by humans, for a given overall processing, are therefore proportional to the number of MIFs necessary to execute the totality of the processing. Thus, over an MIF of 80 ms where the cyclic processing takes 30 ms, if a processing necessitates 1 second of processor time to execute its calculation, at best 20 MIF will be necessary in order to complete it, 20 MIF corresponding to 20×50 ms=1 second where 50 ms is the time remaining in an MIF after the 30 ms of cyclic processing. The response time will therefore be 20×80 ms=1.6 seconds. If the processing becomes concurrent with other asynchronous processings having higher priority than itself, the number of MIFs necessary increases and therefore so does the response time perceived from the exterior.

Notably, this shows that the whole of the difficulty for manufacturers in this field in building a real time architecture is to sequence the processing over tasks having priorities adapted to keep to all of the required response times, taking account of the concurrence of the processings with a maintained probability of compliance. In general, the systems must guarantee that they maintain their performance requirements 100% of the time as "mono-events", that is to say without superimposition of concurrent events. Moreover, the probability that this is no longer the case for concurrent "multi-events" is measured, this probability having to be as low as possible. It can thus be required that the system is designed to keep to all of the response times 99% of the time. This probability can also be different from processing to processing depending on their criticality, that is to say according to their impact on the overall compliance of the operation.

When the number of clients able to request an asynchronous processing, the maximum frequency of their requests and the CPU computation duration corresponding to the processing of the requests by the server are known, there are various techniques known in the prior art for creating and sequencing the real time tasks of a given resource in order to meet these response time requirements with the required probability.

On the other hand, when the number of clients is not known a priori, and the frequency of their requests is not known a priori, as is the case in an ordinary open multi-client architecture, the problem arises of being able to guarantee to the clients a maximum of positive responses. It is not in fact desirable for congestion to result in too many "rejections" of requests.

Moreover, clients making requests to the server do not necessarily all have the same quality of service requirement. For example, some clients can desire a more or less high accuracy on an algorithm, a depth of calculation over an integration or a different optimization, or a more or less exhaustive search through elements of a database. The quality of service can also be referred to hereafter by the term QoS.

The invention advantageously uses a calculation time estimator for each service, this estimator modeling the impact on the computing time of at least one adjustable parameter used by the service.

It is thus possible to determine, with a number of services waiting in the stack, the sequencing which maximizes the number of responses to the clients whilst also maximizing the quality of service for each client, knowing the system in its field of use.

The invention notably consists in determining the adjustment of the parameter or parameters making it possible to obtain a duration of service called $T_{service}$, compatible with the response time expected by the client.

It thus makes it possible to estimate the deadline at which the server will be able to respond to the client, knowing this duration $T_{service}$, and knowing the average CPU duration of an individual processing among proposed services and the state of the stack of requests being processed and waiting. This makes it possible to have adjustment strategies for several parameters (multi-parameter) and for several requests (multi-request), minimizing the number of rejected requests.

Figure 3:
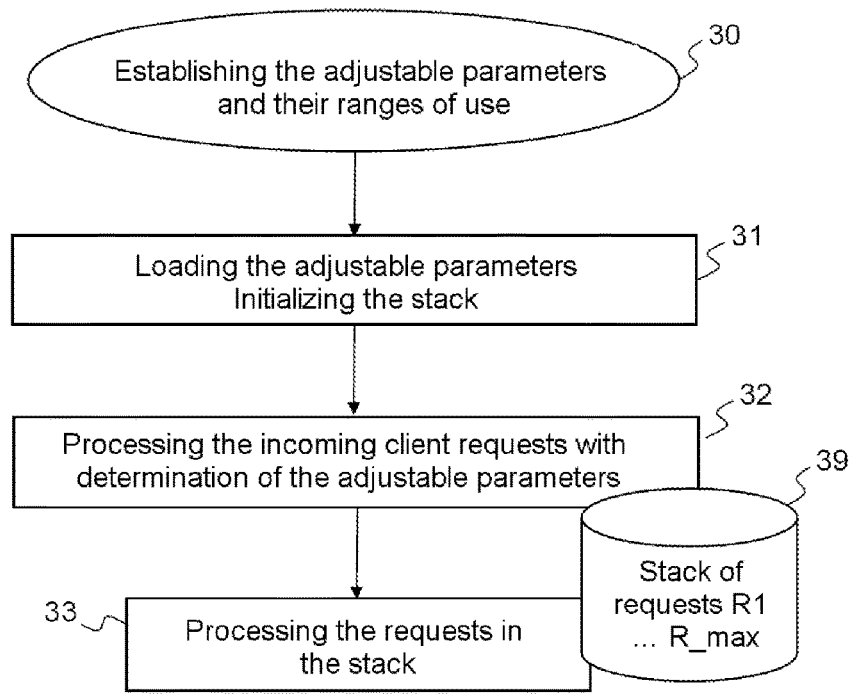
FIG. 3 shows the different possible steps for the implementation of the method according to the invention.

FIG. 3 shows the possible steps of the method according to the invention. A preliminary step 30 establishes the adjustable parameters and their ranges of variation. This preliminary step can be carried out "off line".

In this step, the execution time of each service offered by the server is calculated. Hereafter S(i) will refer to the service of order i, with i varying from 1 to Nb_services, where Nb_services is the number of services. The execution time is notably a function of the parameters related to the service, a parameter related to the service S(i) being denoted param(i, j), with j varying from 1 to NP(i), where NP(i) is the number of parameters related to the service S(i).

In order to calculate this execution time, the method can for example carry out a campaign of measurements of calculation times of the system, over a set of representative scenarios or using a modeling of the performances of the server system.

For each service S(i), processing sequences corresponding to that service are available on input. A processing sequence between an initiating event E(i) and an expected output O(i) is denoted {(E(i), O(i))}.

The method determines a range of variation for each parameter param(i, j) between two limits Min (param(i, j)) and Max (param(i, j)), where:
  Min (param(i, j)) corresponds to the greatest possible degradation of the performances of the server, making it possible to save the most calculation time;
  Max (param(i, j)) corresponds to the absence of degradation, this being the value of the nominal calculation parameter.

The execution time depends on the values of the parameter between these limits. According to the invention, an adjustable parameter is a parameter that can vary between the limits of its range of variation, the variation of the parameter having an effect on the calculation time and the performances of the server, these performances corresponding for example to the accuracy and/or the reliability of the calculations.

A few examples of parameters are given below for:
  numerical integration calculations;
  calculations using floating point numbers;
  a linearization of the calculations for non-linear functions;
  calculations for consultation of databases;
  calculations of trajectories;
this list not being exhaustive.

For the numerical integration calculations:
  Parameters are integration steps and the order of the method for the integral calculation: the numerical integrations are carried out by a discretization of the problem, the size of the integration step has a direct effect on the calculation time, as well as the order of the chosen method (a Runge-Kutta method of order 4 costs more than a second order Newton method for example);
  The larger the integration step, the more the accuracy/reliability of the calculation is degraded;

The lower the order of the method, the more the accuracy/reliability of the calculation is degraded;

Another parameter is the number of iterations for iterative calculations: the great majority of numerical optimizations use iterative methods where the method approaches the optimum solution little by little, until reaching a stop criterion which is a function of the expected accuracy. The method will be able to vary the maximum number of iterations;

The lower the number of iterations, the more the accuracy/reliability of the calculation is degraded;

Another parameter is the number of elements calculated: the numerical integrations of a trajectory typically start from a state x0 in order to end at a final state xf by calculating the control u(t) over the course of time. If the calculation stops at an intermediate point u(t_int), the calculation time is reduced;

Over a trajectory calculation for example, a client may only need the integration over a few elements before the initial state. The time/fuel predictions of a GPS or of a flight management system can be of interest to a client over a few tens of kilometers for example;

The smaller the temporal depth of the calculation, the fewer elements over the complete trajectory are available to the client.

For the calculations using floating point numbers, the method can use 16 bit or 32 bit calculations instead of 64 bit calculations, the mantissa is a parameter:

The smaller the mantissa of the floating point number, the more the accuracy/reliability is degraded.

For the linearization of the calculations for non-linear functions: the method can replace the functions by their finite expansion limited to a given order (the order having an effect on the accuracy), this order being a parameter:

The lower the order, the faster the calculation and the more the accuracy/reliability is degraded.

For the database consultation calculations:

Another parameter, the expected accuracy of the result in the case of interpolation in a database;

The lower the accuracy of the stop criterion becomes, the faster is the interpolation but the more the accuracy/reliability is degraded;

The size of the list returned by the consultation service is also a parameter;

for example, for a GPS service requesting the return of all the elements having a given characteristic (notably service stations): the method can limit the number of elements returned by starting from the position of the vehicle for an aircraft trajectory management system, all of the VOR/DME radio-navigation beacons around the aircraft: the method can limit the number of elements returned by starting from the position of the aircraft, or from the position of a point consulted by the crew (for example: around the destination airport etc . . . )

The more the list is limited, the fewer are the elements of choice available to the client returned by the service.

For the land trajectory calculations, the following can be mentioned:

The use of a more or less simple model, for example an ellipsoid of the GPS model known by the acronym WGS84 more demanding than a spherical approximation or the terrestrial geoid, which is itself more demanding than a local Mercator projection (flattening the geoid);

The simpler the modeling, the more the accuracy/reliability is degraded;

The trajectory algorithms calculating the continuous "thread" of the ground track, the method according to the invention being able to use "transitions between straight lines" with turns of constant radius, or even eliminating the turns from the calculation (the trajectory becomes a class C0 trajectory);

The simpler the modeling, the more the accuracy/reliability is degraded.

The method is applicable to other fields, wherever they use adjustable parameters affecting the quality of calculation obtained, notably in terms of accuracy, reliability or calculation time as in the above examples.

The measurement campaign calculates the end-to-end response times of a sequence of processings, called a functional sequence, whilst varying the parameters according to two options:

Option 1: Only one parameter is varied, the other being fixed, and in this way a performance model is constructed little by little linking response times and accuracy/reliability (compared with a calculation using the "nominal" parameters);

Option 2: random samplings are carried out on the adjustable parameters, sufficiently large in number to have the properties of the law of large numbers (the Monte-Carlo algorithm for example).

Thus, for each sequence $\{E(i), O(i)\}$, there is available, for example in an onboard database in the system hosting the clients and the server:

an estimation of the calculation time, or duration of the corresponding service S(i), $T_{service(S(i), param(i,1), \ldots, param(i, Np(i)))}$ an associated quality of service with respect to the optimum quality, notably with regard to the accuracy, reliability and depth of calculation.

At any time the method can therefore:

calculate the estimation of calculation time on the basis of a set of adjusted parameters;

inversely, calculate a set of adjusted parameters in order to keep to a given objective calculation time Tobj(S(i)), the calculation being able to give several solutions, possibly selectable by the client according to priority rules.

Referring again to FIG. 3: the preliminary step 30 is followed by a first step 31, in which the stack of requests is initialized and the adjustable parameters are loaded.

Figure 4:
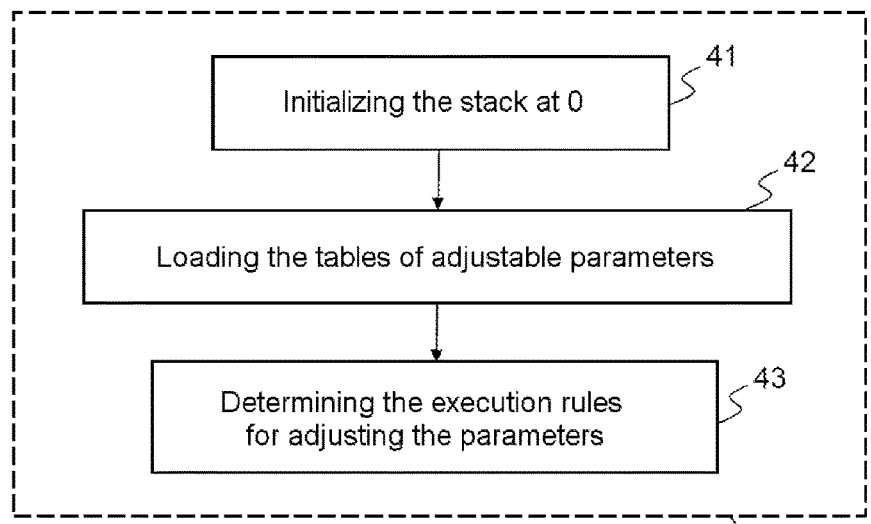
FIG. 4 shows an example of embodiment of a first step.

FIG. 4 shows this first step 31 which comprises three sub-steps 41, 42, 43.

In a first sub-step 41, the stack of requests is initialized at zero; it is empty.

In a second sub-step 42, the method loads a table of adjustable parameters, possibly several tables, with:

their field of use;

the calculation time according to the values of adjustable parameters, according to the preliminary step 30.

In a first embodiment, the server is the only depository of the table of the adjustments and uses it for adjusting the parameters as a function of requests S(i) from the clients and notably of the imposed constraints. This implementation notably has the advantage that the clients do not need to implement software in order to adjust the parameters. They possibly provide their expected response time Trep(i) which the server will convert into calculation time Tobj(i), over which it will make the adjustments via the execution rules of the next sub-step 43.

In another possible embodiment, the client sees the table of the adjustments and makes demands on the server by providing either a response time Trep(i), or a list of adjustable and non-adjustable parameters:

- if a time Trep(i) is provided, the server determines the parameters to be adjusted according to the rules established in the next sub-step 43;
- if a list of adjustable and non-adjustable parameters is provided in addition to the response time Trep(i), the server determines the parameters to be adjusted according to the rules called A3 or A4 which are defined in the next sub-step 43;
- if a list of adjustable and non-adjustable parameters is provided without a response time requirement Trep(i), the server determines the parameters to be adjusted according to the rules called A0 to A4 of the next sub-step 43, setting its own time objective, in order to satisfy several clients.

This embodiment notably has the advantage that the clients have better control of the parameters upon which they wish to act and those which they wish to retain.

In the next sub-step 43, the third sub-step, the method determines the execution rules for adjusting the parameters.

In a possible implementation called "A0", the rule is such that the adjustable parameters are classified with respect to each other by priority. Thus, for each service S(i), a parameter priority table P(i, kp), p varying from 1 to N is established, such that:

$$P(i,k1) > P(i,k2) > \ldots > P(i,kN)$$

When an adjustment is necessary, the method firstly acts on param(i,k1), and determines the corresponding processing time $T_{service(S(i), param(i,1), \ldots, param(i,k1), \ldots, param(i,Np(i)))}$, with respect to the calculation time objective Tobj(S(i));

If the adjustment of the parameter param(i,k1) is not sufficient, that is to say even when set at its minimum value Min(Param(i,k1), the required calculation time is greater than the objective, and so the method acts on the parameter param(i,k2), the parameter Param(i,k1) being fixed at its minimum value;

and so on until the objective Tobj(S(i)) is reached or until all of the parameters have been set against their Min(Param(i, j) limit by the method;

An advantage here is the simplicity and determinism of the solution with respect to the clients.

In another possible implementation called "A1", according to another rule, the parameters are adjusted progressively (in comparison with the implementation A0, this alternative discretizes the ranges of parameters):

When an adjustment is necessary, the method firstly acts on param(i,k1) up to a target value V_cible(i,k1) included between Max(Param(i,k1)) and Min(Param(i, k1)), and determines the corresponding processing time $T_{service(S(i), param(i,1), \ldots, param(i,k1), \ldots, param(i,Np(i)))}$, with respect to the calculation time objective Tobj(S(i));

If the adjustment of the parameter param(i,k1) is not sufficient, the method acts on param(i,k2) up to its limit V_cible(i,k2);

and so on until the objective Tobj(S(i)) is reached or until all of the parameters have been set at their limit at their V_cible(i,ki) by the method;

If the adjustment of the parameters is not sufficient, the method starts again by defining new target values V_Cible(i,ki);

finally, it can happen that the values V_cible are all set against their minimum.

An advantage is notably an action that is more progressive and better distributed over all of the parameters, which all contribute to the effort of reducing the calculation time.

In another possible implementation called "A2", according to another rule, a sub-set of the parameters is firstly adjusted before acting on another sub-set of parameters, a solution which mixes the implementation A0 and the implementation A1:

An advantage is that this alternative A2, which is even more flexible, makes it possible to retain the most important parameters for the client by acting firstly on the others, whilst avoiding too harsh a degradation of an adjustment parameter.

In another possible implementation, called "A3", the parameters to be adjusted and the parameters to be retained are chosen by the client, according to one of the modes "A0", "A1" or "A2" (the client possibly chooses the mode, as well as the parameters).

An advantage of this alternative, which is even more flexible, is that it allows the client to adjust its requests in order to retain the parameters that are of interest to it.

In another implementation called "A4", according to another rule, the parameters to be adjusted and the limits of adjustment (maximum target values Max(V_Cible)), are chosen by the client according to one of the modes "A0", "A1", "A2" or "A3".

This alternative notably has the advantage that it is the most flexible for the clients: it allows the client to make the best adjustment of its requests.

Other alternatives are possible, mixing the client requirements and the constraints of the server. Any other combination is possible, without this restricting the scope of the invention.

Regarding dynamic adjustment, an execution rule called "D1" can authorize the method to dynamically adjust the parameters which were calculated for the services in progress, in order to allow the insertion of a new service.

An alternative called "D2" can prohibit the dynamic adjustment in such a way that once the list of adjustable parameters is calculated, the method no longer modifies it.

Regarding the acceptance and/or rejection of requests, an alternative rule, called "R1" can reject any request whose objective response time cannot be met.

In an alternative called "R2" the method can reject the request if the adjustable or non-adjustable parameters requested by the client do not make it possible to comply with the objective time fixed by the server.

In an alternative rule called "R3", the method does not reject any request but warns the client if the adjustable/non-adjustable parameters or the objective response time cannot be complied with.

Regarding the progressive aspect of the quality of service, in a possible implementation called "Q1", the method carries out a complete calculation if necessary (i.e. without adjustment), after an intermediate calculation.

In another possible implementation called "Q2", the method carries out several successive intermediate calculations with a quality of service which increases each time, that is to say with increasingly less adjusted parameters, until the complete calculation without adjustment of parameters.

For these different alternatives "Ai", the method, in a possible implementation, chooses as adjustable parameter a client "timeout", that is to say a response time expected by the client:

If the value of the "timeout" is 0, there is therefore no "timeout" if the server does not have the execution time to respond at the basic response time, in this case the method rejects the request according to one of the above alternatives "Ri";

If the value is finite, given in milliseconds, no account is taken of the basic response time and control is carried out with respect to the input value for accepting or rejecting the instruction, according to an alternative "Ri";

If the value is infinite, the method waits for the processing to end, whatever the processing time may be.

Referring again to FIG. 3. In a second step 32, the method processes the incoming requests with the determination of the adjustable parameters.

Figure 5:
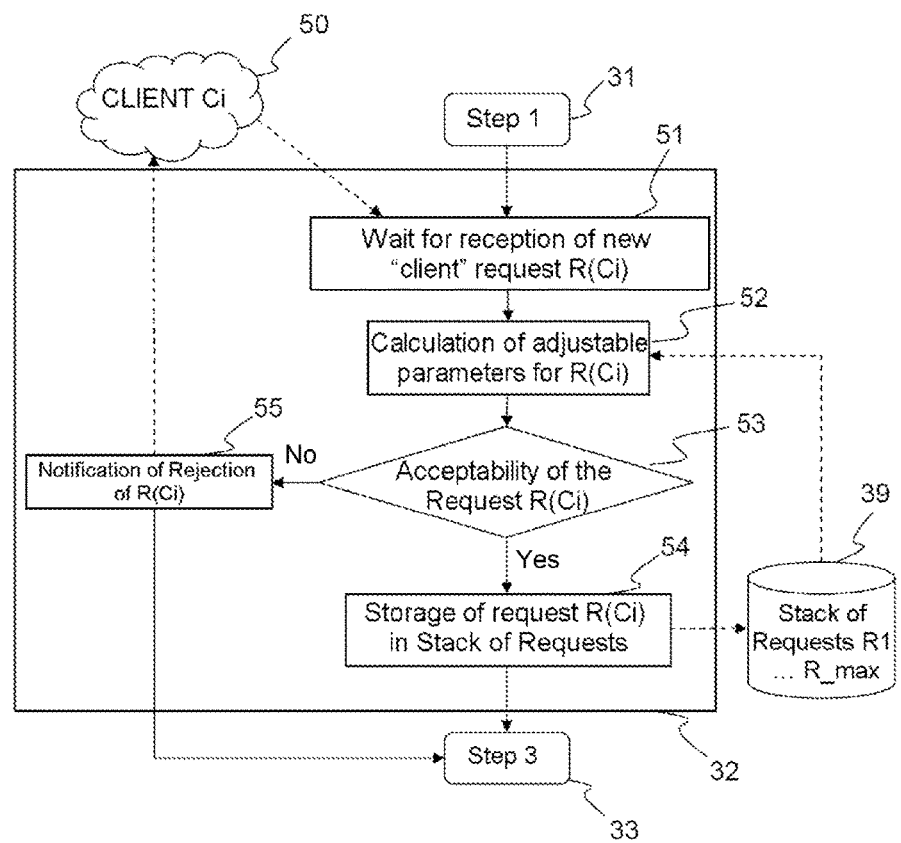
FIG. 5 shows the possible sub-steps of the second step.

FIG. 5 shows the possible sub-steps for this second step 32.

A first sub-step 51 consists in retrieving a new request R(Ci) coming from a client Ci 50.

The request is dealt with in a second sub-step 52 if the system can manage it within the time allowed, that is to say if the calculation time necessary $T_{service(S(i),param(i,1), \ldots, param(i,kj), \ldots, param(i,Np(i)))}$ for processing the request is compatible with the objective response time Tobj(i), after application of the execution rules of the first step 31 of the method.

With regard to robustness, if the stack 39 of requests is full, a rejection notification with the "Stack full" status is given.

In an alternative, the method again dynamically determines the adjustments of parameters of all the requests present in the stack, each time a new request is received. This degrades the QoS of the services already present in the stack, and the process of dynamic determination for each service stops when the service reaches its limit response time.

In a "multi-resource" (that is to say multi-processor) alternative, this distribution task is executed on one of the resources, which distributes the requests over different resources, as a function of the load on the said resources. Thus, if a resource i is busy processing requests, and it cannot absorb a new request in its stack without guarantee of response within the time allowed, the supervisor addresses a less loaded resource j (if it exists).

In a third sub-step 53, the result of the second sub-step 52 is routed:
either to the stack of requests via a sub-step 54;
or to a sub-step 55 of notification of rejection, when for example the deadline requested by the new client is not compatible with the cumulated duration of the processings already present in the stack.

This sub-step 55 is a protocol service with the client for sending a "Refusal" status of the request Ri and possibly a sub-status (processing too long, stack full for example) according to the rules "R1", "R2" or "R3" of the first step 31 of the method. In the "R3" case, it is not a "refusal" status that is sent but an estimation of the time necessary for responding to the client.

The other sub-step 54 sends a write request to the "stack of requests".

It therefore notably writes in the stack:
the service S(i) to be executed;
the parameters param(i,ki) to be adjusted and the adjustment values of the said parameters.

In the multi-resource alternative, the stack can be managed solely by the resource which supervises all of the requests. Advantageously, a local copy of the stack 39 on all of the resources, or making the stack 39 common to all of the resources can be carried out in order to avoid robustness problems, for example a case of a supervision resource failing.

Referring again to FIG. 3 which shows the possible steps of the method according to the invention: in a third step 33, the processing of the requests in the stack 39 is carried out. In this third step 33 there is executed, for each resource, the different requests in the stack 39 of requests. This step 33 can be interrupted at any time by the second step 32 if a client wishes to include a new request.

Figure 6:
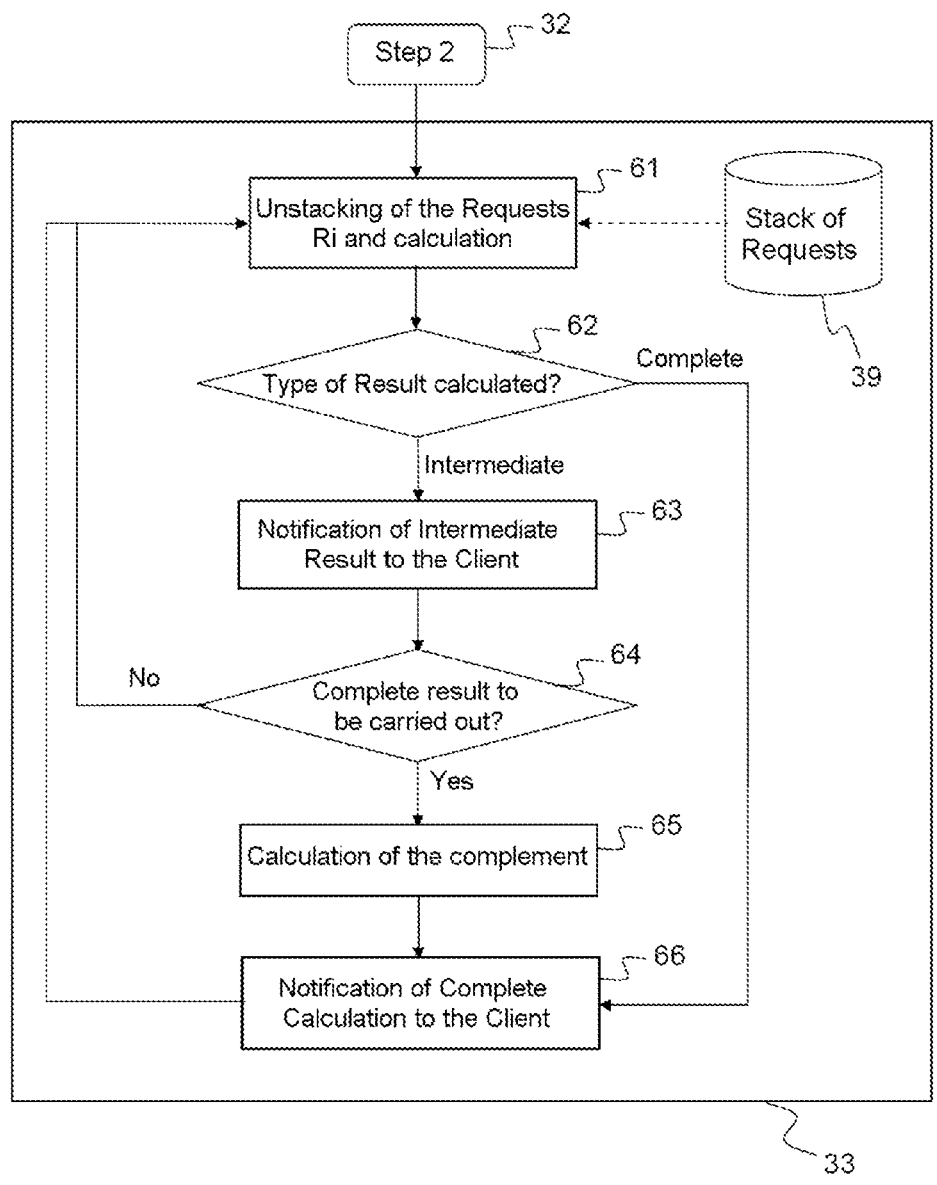
FIG. 6 shows the possible sub-steps of the second step.

FIG. 6 shows the possible sub-steps for the implementation of this third step 33 of the method according to the invention.

In a first sub-step 61, the method firstly checks if a request is stacked in the stack of requests 39. If this is the case, this request becomes the new request to be executed. If this is not the case, the method places this step 61 on hold. This same sub-step 61 carries out the calculation of the corresponding service S(i) using the adjusted parameters of the sub-step 55 of the second of the second step 32 of the method.

A comparison is carried out in a second sub-step 62. More precisely, the accuracy and the reliability calculated in the first sub-step 61 are compared with the accuracy and reliability objective, the degradation being known via the table of the parameters:
if it was possible to carry out the calculation to its conclusion, without adjustment of the parameters, the calculation is called "complete" and the client is notified of the result via a sub-step 66;
in the contrary case, the calculation is called "intermediate", and the client is notified via a sub-step 63.

This sub-step 63 is followed by a sub-step 64 where it is determined if an additional calculation is necessary:
the accuracy and reliability objective requested by the client is achieved, the calculation is considered as ended and the method returns to the first sub-step 61 in order to start the next calculation on the basis of the request for execution in the stack 39, or waits if there are no requests stacked in the stack;
if the accuracy and reliability objective is not achieved, the complete calculation is initiated in a next sub-step 65. This calculation is carried out on a task, possibly of lower real time priority, which can be time delayed in order to allow the calculations of higher priority present in the stack to be carried out.

This sub-step 65 is followed by the sub-step 66 of notification to the client that the calculation is complete.

In another possible embodiment, the complete calculation is initiated immediately afterwards, before the calculations remaining to be carried out in the stack, in order to finish responding to the client.

Figure 7:
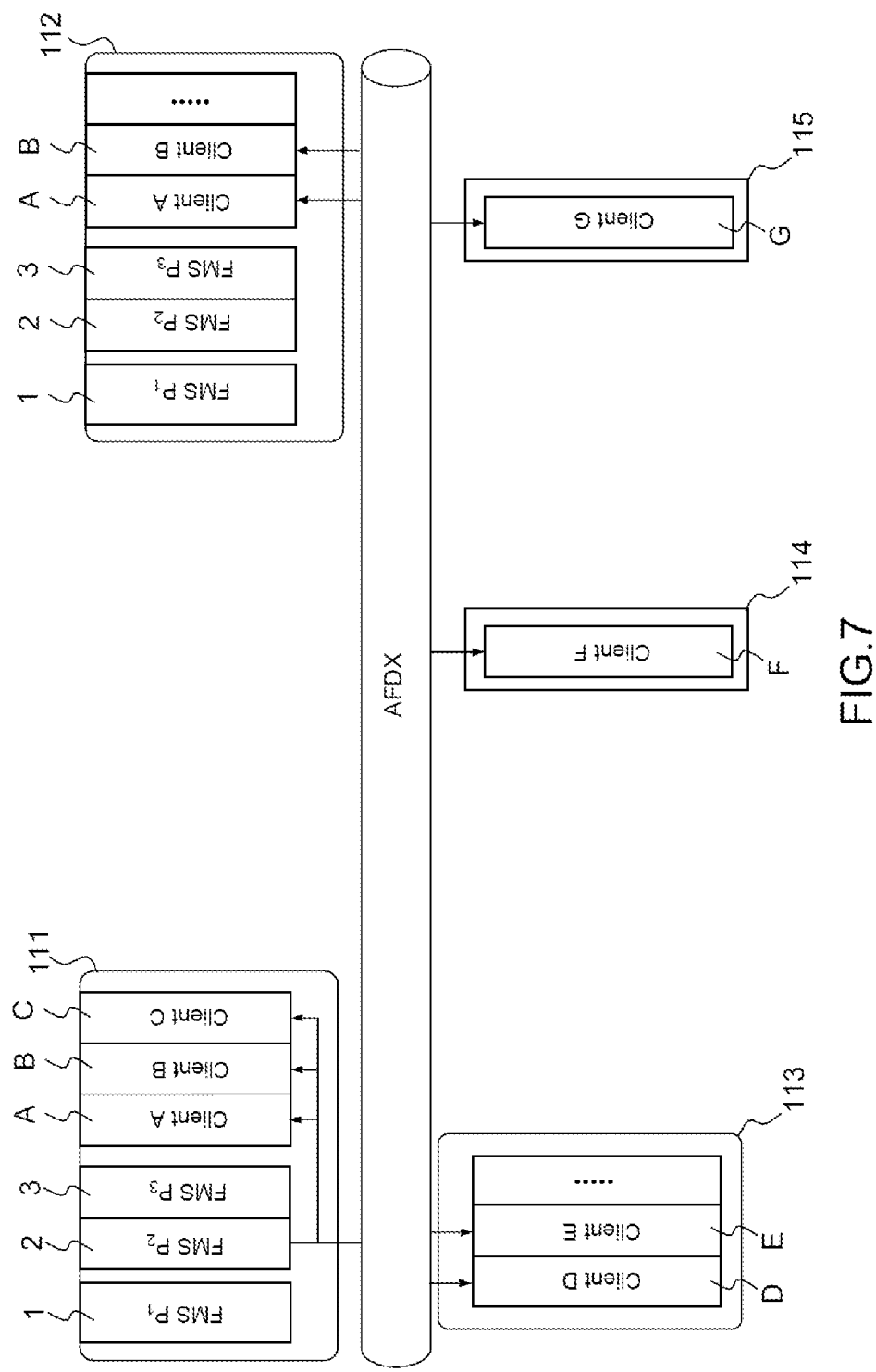
FIG. 7 shows an example of physical representation of the clients in the case of application to an FMS system.

FIG. 7 shows an example of physical representation of the clients in the case of application to an FMS system notably of the type described with reference to FIG. 1. The server is a flight management application. The system comprises for example two physical modules 111, 112 forming the physical resources each notably comprising a server. In this example, the server is a flight management application.

As the system has redundancy, the two physical resources carry out the same functions. The identified and known clients 1, 2, 3 are hosted in the physical modules 111, 112, which are the physical modules of the FMS. The external clients, not previously identified, can either be applications hosted in the physical modules 111, 112 hosting the server, or applications distributed in the aircraft in other physical modules 113, 114, 115. In the example shown in FIG. 7, three external clients A, B, C are hosted in the physical module 111, and 2 external clients A and B are hosted in the physical module 112. For this purpose, the clients A, B, C have for example internal RAMs in the modules as physical resources, the application codes of the clients A, B, C being copied into the internal RAMs of the module to which they are connected (111 for A,B,C and 112 for A,B). Other external clients D, E, F, G communicate with the physical modules by an AFDX link, the access occurring by standardized protocols, ARINC 653 in the example shown in FIG. 7. The clients can be among the following applications:
- an HMI, an integrated IHS, an AID
- a CMU
- a TCAS
- a TAWS
- a WIMS or a WxR
- an EFB
- a tablet
- an FQMS
- a PA
- an FWS
- an IFE these applications having been presented during the description of the FMS system shown in FIG. 1. Other client applications are of course possible.

Three large families of services can be defined in order to classify all of the services of an FMS according to the AEEC ARINC 702A standard.

A first family comprises the geographic data consultation services 130 (navigation data & dynamic magnetic variation), allowing the clients to search for geographic information or magnetic variation at a point of the globe. For this family, the adjustable parameters can be as follows:
- the number of elements returned;
- the type of priority elements (beacons, airports, waypoints . . . );
- the search space (search area or volume about an element);
- the search countries by filtering ICAO codes (International Civil Aviation Organization).

A second family comprises the aircraft performance consultation services (aircraft characteristics & performances) making use of the lateral trajectory 120 and prediction 140 functions and the performance database 150, this family notably comprising:
- characteristic limits of the aircraft (for example: min and max weights, certified altitude ceiling . . . ), takeoff and landing speeds (called characteristic speeds), flight envelope calculations (max speeds, stall speeds, max roll . . . );
  - the adjustable parameters notably being the accuracy of the calculation and the number of iterations;
- integration computations according to the chosen aircraft modes (climb of X feet at constant thrust, descent at specified air slope and fixed speed, turn at imposed angle . . . ), package calculations (for certain FMS systems, simplified performance calculations can be defined in the performance database 150, where the required accuracy is less);
  - the adjustable parameters notably being:
    - the sizes of the integration steps;
    - the number of iterations;
    - the calculation or not of the transitions into turns on the lateral trajectory;
    - the testing or not of the flight envelope limits (saturation);
    - the format of the floating point numbers;
    - the linearization of the mostly used functions (trigonometric functions for example).

A third family comprises the "flight management" services:
- consultation of the status of the aircraft (position, speed, status of systems connected to the FMS, such as the status of the engines, the modes engaged in the automatic pilot, etc . . .
  - the adjustable parameters notably being the number of parameters;
- consultation and modification of the flight plan and of the 5D trajectory;
  - the adjustable parameters being the same as for the services of consultation of the performances of the aircraft;
- consultation and modification of the flight initialization data (input of takeoff speeds, of the cruise altitude, of the meteorological prediction, of the fuel consumption modes . . . );
  - the adjustable parameters being the same as for the services of consultation of the performances of the aircraft.

The method applies for example in the case where the server is one of the following applications:
- an FMS
- an HMI, an integrated IHS, an AID
- a CMU
- a TCAS
- a TAWS
- a WIMS or a WxR
- an EFB
- a tablet
- an FQMS
- a PA
- an FWS
- an IFE
- a taxiing application.

These applications were presented during the description of the FMS system shown in FIG. 1. One application that can be added to these applications is a taxiing application (TAXI). The clients can be any one of the above applications other than the server, as well as any other application.

The invention also applies to an FMS device where the server is an application from among:
- the navigation database NAV DB, 130;
- the performance database PRF DB, 150;
- the flight function FPLN, 110;
- the lateral trajectory function TRAJ, 120;
- the prediction function PRED, 140;
- the guidance function GUID, 200;
- the location function LOC NAV, 170;
- the digital data link DATA LINK, 180;
- the man-machine interface MMI (Human-Machine Interface).

The clients can be any one of these applications other than the server, as well as any application.

Via the creation of intermediate calculations with adjusted parameters, the invention notably has the advantages:
- of minimizing the rate of refusal of requests from clients;
- of allocating calculation time to third party clients, even minimal, in a guaranteed manner;
- of always being able to give a prior response of acceptance or refusal to undertake a request, accompanied by a status of the accuracy and reliability that will result from the calculation.

The invention also has the advantage that it makes it possible, via the concept of execution rules, to obtain a good compromise between the flexibility allowed to the client for managing its requests and the computing time performances of the server.

The method according to the invention also advantageously allows the client to have a return over the time necessary for carrying out a calculation when it has fixed a certain number of parameters to be retained and it has fixed the adjustments for the parameters to be adjusted.

The invention claimed is:

1. A method for execution of services in real time by an application of a Flight Management System (FMS) for at least one client, the method comprising:
    a preliminary step that establishes, for each service:
        a list of adjustable calculation parameters that can be varied in a given range,
        a calculation time, and
        quality of service information according to values of the adjustable calculation parameters,
    receiving a request from the at least one client for a given service,
    adjusting the values of the adjustable calculation parameters as a function of a given constraint provided to the FMS by the at least one client, wherein the given constraint involves a maximum duration of a time of response to the request, and
    executing the service using the adjusted values of the adjustable calculation parameters,
    wherein several successive intermediate results are calculated, with parameters increasingly less adjusted for each calculation until a complete calculation of execution of the service without adjustment of the parameters, an increasingly less adjusted parameter being a parameter whose value is increasingly distant from a value making it possible to comply with the given constraint; and
    wherein at least one intermediate result of execution of the service is calculated with an associated quality of service and wherein the intermediate result is notified to the at least one client.

2. A method according to claim 1, wherein the given constraint involves a use of a set of non-adjustable calculation parameters.

3. A method according to claim 1, wherein, for each service, the adjustable parameters are classified by priority, and in a case of necessary adjustment of the parameters in order to comply with the given constraint:
    a value of a parameter of highest priority is adjusted firstly and an execution time of the service is calculated;
    wherein if the adjustment of the value of the parameter of highest priority does not make it possible to comply with the given constraint, even at a limit of its range of variation, a value of a parameter having a next priority is adjusted, the value of the parameter of highest priority remaining fixed at the limit of its range of variation; and
    the adjustment of the parameters is repeated in order of priority, until the constraint is complied with or until all of the adjustable parameters have been set at an upper limit of their respective range of variation.

4. A method according to claim 3, wherein the parameters of a sub-set of the list of adjustable parameters are adjusted first.

5. A method according to claim 1, wherein, for each service, the adjustable parameters are classified by priority, and in a case of necessary adjustment of the parameters in order to comply with the given constraint:
    a value of a parameter of highest priority is first adjusted to a first target value within its range of variation and an execution time of the service is calculated;
    wherein if the adjustment of the value of the parameter of highest priority does not make it possible to comply with the given constraint, even at a limit of the first target value, a value of a parameter having a next priority is adjusted to a second target value, within its range of variation, the value of the parameter of highest priority remaining fixed at the limit of the first target value; and
    the adjustment of the parameters is repeated in order of priority, until the constraint is complied with or until all of the adjustable parameters have been set at their limit, new target values within the ranges of variation of the parameters being defined if the adjustment does not make it possible to comply with the given constraint after having reached a limit of a target value for each of the adjustable parameters.

6. A method according to claim 1, wherein the list of the adjustable parameters is established by the at least one client.

7. A method according to claim 1, wherein the ranges of variation of the parameters are determined by the at least one client.

8. A method according to claim 1, wherein a complete execution of the service is carried out after the intermediate calculations.

9. A method according to claim 1, wherein the parameters of the list are adjusted each time a new request is received.

10. A method according to claim 1, wherein the execution of the requested service is refused if its execution with the adjustable parameters does not make it possible to comply with the given constraint.

11. A method according to claim 1, wherein an item of information is transmitted to the at least one client if the execution of the requested service with the adjustable parameters does not make it possible to comply with the given constraint.

12. A real time system implementing the method according to claim 1, the real time system comprising:
    a server;
    at least one physical module in which the server is installed; and
    a memory implemented by the at least one physical module,
    wherein the at least one client is configured as an application installed in the physical module, and
    wherein the at least one client is configured to communicate with the server via the memory inside the at least one physical module.

13. A system according to claim 12, further comprising other clients, wherein the other clients are applications distributed in other physical modules and configured to communicate with the server via a network protocol.

14. A system according to claim 13, wherein the at least one client and the other clients are included in the following list of applications:
    an HMI (Human Machine Interface);
    an HSI (Human System Interface);
    an AID (Aircraft Interface Device);
    a CMU (Communication Interface Device);
    a TCAS (Traffic Collision Avoidance System);
    a TAWS (Terrain Awareness and Warning System);
    a WxR (Weather Radar);

an EFB (Electronic Flight Bag);
an FWS (Flight Warning System);
an IFE (In Flight Entertainment); and
a taxiing application.

\* \* \* \* \*